(12) United States Patent
Hoffman (10) Patent No.: US 11,179,654 B2
(45) Date of Patent: Nov. 23, 2021

(54) METHODS AND SYSTEMS FOR PROCESSING A VAPOR STREAM FROM A THERMAL DESORPTION PROCESS

(71) Applicant: CALAERIS ENERGY & ENVIRONMENT LTD., Vancouver (CA)

(72) Inventor: Barry Hoffman, Vancouver (CA)

(73) Assignee: Calaeris Energy & Environment Ltd., Vancouver (CA)

( * ) Notice: Subject to any disclaimer, the term of this patent is extended or adjusted under 35 U.S.C. 154(b) by 478 days.

(21) Appl. No.: 16/090,797

(22) PCT Filed: Apr. 19, 2017

(86) PCT No.: PCT/CA2017/050483
§ 371 (c)(1),
(2) Date: Oct. 2, 2018

(87) PCT Pub. No.: WO2017/190227
PCT Pub. Date: Nov. 9, 2017

(65) Prior Publication Data
US 2020/0324221 A1     Oct. 15, 2020

Related U.S. Application Data

(60) Provisional application No. 62/330,950, filed on May 3, 2016.

(51) Int. Cl.
*B01D 5/00*     (2006.01)
*B01D 17/02*     (2006.01)
(Continued)

(52) U.S. Cl.
CPC ....... *B01D 5/0027* (2013.01); *B01D 17/0217* (2013.01); *B01D 17/042* (2013.01); *B01D 21/262* (2013.01); *B09C 1/06* (2013.01)

(58) Field of Classification Search
CPC .................................................. B01D 5/0027
See application file for complete search history.

(56) References Cited

FOREIGN PATENT DOCUMENTS

CA     2473256     7/2003
CA     2817322     11/2013
(Continued)

OTHER PUBLICATIONS

International Patent Application No. PCT/CA2017/050483, International Search Report and Written Opinion dated Aug. 7, 2017, 7 pages.

*Primary Examiner* — Peter Keyworth
(74) *Attorney, Agent, or Firm* — Kilpatrick Townsend & Stockton LLP (57) ABSTRACT

Methods and systems for treating an oil/water vapor stream containing solids fines. Routing a feed composition of oil/water vapors containing fine solids to a condensing unit, combining the feed composition with a cooled OWS emulsion, forming a warmed OWS emulsion. The warmed OWS emulsion is routed to a surge vessel containing a volume of surge OWS emulsion, where after a first portion of the surge OWS emulsion is routed to a heat exchanger, forming the cooled OWS emulsion, and a second portion of the surge OWS emulsion is routed to an OWS separation unit. The OWS separation unit may be one or more disc stack centrifuges, in some cases preceded by one or more decanting centrifuges. In certain embodiments the oil/water vapor stream containing solids fines is generated from a thermal desorption unit, such as a turbulent vacuum thermal desorption unit. Systems may be integrated with thermal desorption units and drilling rigs.

12 Claims, 6 Drawing Sheets

(51) Int. Cl.
*B01D 17/04* (2006.01)
*B01D 21/26* (2006.01)
*B09C 1/06* (2006.01)

(56) References Cited

FOREIGN PATENT DOCUMENTS

| | | |
|---|---|---|
| CA | 2897875 | 7/2014 |
| EP | 1792042 | 6/2007 |
| WO | 2014113894 | 7/2014 |

METHODS AND SYSTEMS FOR PROCESSING A VAPOR STREAM FROM A THERMAL DESORPTION PROCESS

TECHNICAL FIELD

The present disclosure relates generally to the field of separation methods and systems, and more specifically to methods and systems for processing a vapor stream from a thermal desorption process, more particularly from (but not limited to) turbulent vacuum thermal separation methods and systems employed for separating solids from various compositions comprising oil, water, and solids.

BACKGROUND ART

Thermal desorption methods and systems are used for the separation and recovery of hydrocarbons from oil contaminated soils and oily sludges such as spent drilling fluids and drill cuttings. Every thermal desorption method and system generates some quantity of fines in the vapor stream ranging from very high fines loading due to the aggressive mixing (so much so that it generates sufficient heat to sustain the process) thereby generating up to 5 wt % fines of the feed material after removal with cyclone(s). Fines are a contaminant that impacts the quality of the recovered oil that is typically a primary driver in using thermal desorption due to the high value of the recovered oil. Unfortunately, present methods and systems do not manage these fines efficiently. Removal of fine solids at high temperatures containing a mix of hydrocarbon and steam vapors using cyclones, bag filters, and/or high temperature oil scrubbers is challenging for all thermal desorption systems.

Simple gravity oil/water/sludge separators allow settling time for the oil/water to separate and the fine solids to settle to the bottom of the separator vessel as sludge. A feed source (could be a pipeline or vessel) feeds an oil/water/solids (OWS) sludge to a thermal desorption unit, producing a primarily solids stream and a primarily oil/water vapor stream, which is then routed to a cyclone or filtration unit where more solids, typically fines, are removed and combined with the primarily solids stream. A stream comprising desorbed oil/water vapors and fines carryover, is routed to a condenser, typically a direct contact spray condenser, where a spray of water separated in an oil/water separator is pumped via a water quench pump. The oil/water separator produces a sludge, a primarily oil stream and a primarily water stream. However, the fine solids can end up in multiple places in gravity separation vessels. Rag layers are emulsions that are difficult to separate which occur at the interface of the oil and water layers along with the water and settled sludge interfaces layers. Fine solids can also be found floating on top of the oil layer. Rag layers occur due to the electrostatic charges on the fine solids, density, surfactant coating as in the case of drill cuttings/fluids and particle size. To exasperate the problem, the fines can be water wet or oil wet on the surface depending upon the origin of the fines, particularly drilling fluid and drill cuttings solids. This makes identifying, measuring, isolating, capturing and concentrating the rag layer very difficult. Even with extensive residence time that can be several days resulting in very large volume separation and settling vessels, there are still no guarantees that separation will occur. Concentration of the fines and elimination of the rag layer is important as it minimizes the amount of sludge generation since the sludge is returned to the feed. Reprocessing of the sludge essentially reduces the processing rate of the thermal desorption system.

Poor separation of the oil and water phases can potentially lead to the release of contaminated water to the environment, or shut down of the entire process, or produce an out of specification oil or excessive amount of sludge. In light of the above, the art remains in need of methods and systems to condense desorbed vapors that decreases energy costs, significantly reduces system complexity, equipment, footprint and weight. At least for these reasons, it would be an advance in the art of recovery of hydrocarbons and/or valuable solids (such as catalyst fines or metals) from waste streams if desorbed vapors could be condensed using methods and systems that meet one or more of these goals.

SUMMARY

In accordance with the present disclosure, methods and systems are described which overcome one or more of the above-mentioned problems with currently known thermal desorption methods and systems. Certain methods and systems of this disclosure utilize a unique direct contact condensing system that does not utilize separated water or separated oil from the condensation system, eliminating or greatly reducing the need for any gravity based separation process that is used as the quenching fluid for condensing the vapors. In addition, certain methods and systems of this disclosure are capable of handling a very wide range of the amount of carryover over fine solids in the vapor phase and wide composition range of oil/water/fine solids sludge. Certain system and method embodiments may include a drilling rig and method that employs a drilling fluid in drilling wellbores for the production of hydrocarbons from a subterranean hydrocarbon reservoir.

A first aspect of the disclosure is a method comprising:
  a) routing a feed composition comprising (or consisting essentially of, or consisting of) oil/water vapors containing fine solids to a condensing unit, the condensing unit comprising a condensing sub-unit selected from an eductor and a quench vessel;
  b) combining the feed composition with a cooled OWS emulsion in the condensing sub-unit, forming a warmed OWS emulsion having same or different composition of the cooled OWS emulsion;
  c) routing the warmed OWS emulsion to a surge vessel containing a volume of surge OWS emulsion;
  d) routing a first portion (either a major or minor portion) of the surge OWS emulsion to a cooler, forming the cooled OWS emulsion (for example using a centrifugal or other pump); and
  e) routing a second portion (either a minor or a major portion) of the surge OWS emulsion to an OWS separation unit.

Exemplary methods of this disclosure include those wherein the feed composition is a recovered fluid composition from a thermal desorption unit, where the thermal desorption unit is either one operating under low negative pressures (for example 1 or 2 inches of water below atmospheric pressure), or operating under turbulent, high vacuum (for example, 25 to 29 inches of Hg below atmospheric pressure) thermal conditions. Yet other exemplary methods are those wherein the routing of the second portion of the surge OWS emulsion to the OWS separation unit comprises routing the second portion of the surge OWS emulsion to one or more disc stack centrifuges, wherein if there are more than one disc stack centrifuge they are operated in parallel, series, or combination thereof. Still other exemplary methods are those wherein one or more decanting centrifuges precedes the one or more disc stack centrifuges. Still other exemplary methods are those performed continuously.

Another aspect of the disclosure is a system comprising (or alternatively, consisting essentially of, or consisting of):
   a) a condensing unit configured to accept a feed composition comprising or consisting essentially of oil/water vapors containing fine solids, the condensing unit comprising a condensing sub-unit selected from one or more eductors and one or more quench vessels;
   b) the condensing unit configured to combine the feed composition with a cooled OWS emulsion in the condensing sub-unit, forming a warmed OWS emulsion having same or different composition of the cooled OWS emulsion;
   c) a surge vessel fluidly connected to the condensing unit and configured to accept the warmed OWS emulsion routed from the condensing unit, the surge vessel having a volume sufficient to contain a surge volume of OWS emulsion (and preferably of such volume equal to the number of sub-unit circulations so as not to create an emulsion that is inseparable at least with centrifuge equipment);
   d) the surge vessel fluidly connected to a cooler and separately fluidly connected to an OWS separation unit, the cooler configured to accept some (a minor portion) of the surge volume of OWS emulsion and form the cooled OWS emulsion, the cooler fluidly connected to the condensing unit, the OWS separation unit configured to accept the minor portion of the surge volume of OWS emulsion.

Exemplary systems include those wherein the OWS separation unit comprises one or more disc stack centrifuges fluidly connected in parallel, series, or combination thereof. Yet other exemplary systems include those wherein the OWS separation unit comprises one or more decanting centrifuges fluidly connected in parallel, series, or combination thereof, and fluidly connected upstream of the one or more disc stack centrifuges. In still other exemplary systems, the condensing unit may be an eductor.

Certain systems of this disclosure, or components thereof, may be truck-mounted, rig-mounted, or skid-mounted. Certain systems may be modular, in that certain sub-systems may be available on separate vehicles.

Systems and methods of this disclosure will become more apparent upon review of the brief description of the drawings, the detailed description, and the claims that follow. It should be understood that wherever the term "comprising" is used herein, whether describing an embodiment or a component or step of an embodiment, other alternative embodiments, components, and steps where the term "comprising" is substituted with "consisting essentially of" are explicitly disclosed herein. It should be further understood that wherever the term "comprising" is used herein, other alternative embodiments, components, and steps where the term "comprising" is substituted with "consisting of" are explicitly disclosed herein. Moreover, the use of negative limitations is specifically contemplated; for example, certain streams and equipment in the systems and methods of the present disclosure may comprise a number of ingredients, phases, and/or physical components and features, but may be devoid of certain optional ingredients, phases, hardware and/or other features. For example, certain streams may be devoid of water, or devoid of oil, or devoid of solids altogether or of certain size. Further, a stream returned to a drilling rig may be devoid of additional chemicals and additives.

BRIEF DESCRIPTION OF DRAWINGS

The manner in which the objectives of the disclosure and other desirable characteristics may be obtained is explained in the following description and attached drawings in which:

It is to be noted, however, that the appended drawings of FIGS. 1-6 and 9 may not be to scale, and FIGS. 1-9 illustrate schematically only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling.

As noted in the Background, typically a stream comprising desorbed oil/water vapors and fines carryover is routed to a condenser, typically a direct contact spray condenser, where a spray of water separated in an oil/water separator is pumped via a water quench pump. The oil/water separator produces a sludge "SL", a primarily oil stream "O" and a primarily water stream "W". However, the fine solids can end up in multiple places in gravity separation vessels. Rag layers ("RL") are emulsions that are difficult to separate which occur at the interface of the oil ("O") and water ("W") layers along with the water and settled sludge interfaces layers. Fine solids can also be found floating on top of the oil layer. Rag layers occur due to the electrostatic charges on the fine solids, density, surfactant coating as in the case of drill cuttings/fluids and particle size. To exasperate the problem, the fines can be water wet or oil wet on the surface depending upon the origin of the fines, particularly drilling fluid and drill cuttings solids. This makes identifying, measuring, isolating, capturing and concentrating the rag layer very difficult. Even with extensive residence time that can be several days resulting in very large volume separation and settling vessels, there are still no guarantees that separation will occur. Concentration of the fines and elimination of the rag layer is important as it minimizes the amount of sludge generation since the sludge is returned to the feed. Reprocessing of the sludge essentially reduces the processing rate of the thermal desorption system.

Poor separation of the oil and water phases can potentially lead to the release of contaminated water to the environment, or shut down of the entire process, or produce an out of specification oil or excessive amount of sludge. In light of the above, the art remains in need of methods and systems to condense desorbed vapors that decreases energy costs, significantly reduces system complexity, equipment, footprint and weight. At least for these reasons, it would be an advance in the art of recovery of hydrocarbons and/or valuable solids (such as catalyst fines or metals) from waste streams if desorbed vapors could be condensed using methods and systems that meet one or more of these goals.

The methods and systems of the present disclosure condense desorbed vapors in a manner that decreases energy costs, significantly reduces system complexity, equipment, footprint and weight. The methods and systems utilize the recovered fluid in a condenser, and therefore are dubbed Recovered Fluid Condenser (RFC) methods and systems. The methods and systems of the disclosure operate without a hot oil fines scrubber (UFS) or a gravity based oil/water separator or a gravity based oil/water/sludge separator. In fact, the condensed fluid is never allowed to separate before returning to the direct contact condenser, which is an important distinction. The methods developed use a direct vapor—liquid contact where the quench liquid may be in the form of a spray in a quench vessel or an eductor. Since the condensed fluid is never separated and continuously re-circulated, the condensed fluid eventually becomes an emulsion from the mechanical shearing through the circulating centrifugal pump and nozzle common in all quench vessel equipment (or other combination of pump and shearing equipment). As the volume of condensed fluid/emulsion increases with processing of the feed material to the condensing unit, an off line centrifuge(s) is used to separate and recover high quality oil, water and concentrated solids with traditional methods.

The RFC methods do not use separated water or oil to condense the vapors like all other methods. Oil or water can be used to charge the system, which is used as the quench fluid for the quench vessel system, and also motive flow for an eductor quench system. Over time, the motive fluid becomes an emulsion comprising of the condensed recovered oil, condensed water and fines (Recovered Fluid Emulsion—RFE). The RFE is removed from the circulating loop and separated by a centrifuge(s) into Recovered Oil, Recovered Water and Sludge fractions. The Recovered Oil is returned to the client for reuse and in the case of drill cuttings and spent drilling fluids feed material types, as base oil for the makeup of drilling fluid. The Recovered Water is used for rewetting of the Treated Solids. The Sludge is returned to the Feed Hopper (vessel or pipeline) for reprocessing. There is a potential opportunity to utilize the RFE without separation and minor chemical adjustments that could be blended in some ratio into a drilling fluid.

There are several benefits of not separating oil/water/sludge phases utilized in known methods. Unlike the hot oil scrubber used in some methods, methods and systems of this disclosure are used outside of a vacuum environment and operate under ambient pressures and temperatures, eliminating the complexities that involve operating a condensing system in high vacuum, high temperature environment. In addition, the emulsion provides the benefit of being able to operate in sub zero climates due to the emulsion having a lower freezing temperature, in some embodiments 5° C., or 6, or 7 or 8, or 9, or 10° C. lower than water.

Many industries generate oil-based slurries. As used herein the term "oil" includes, but is not limited to, hydrocarbon oils. An oil-based slurry (OBS) composition may be a homogenized, viscous and stable semi-solid composition containing oil, water (usually emulsified) and fine solids. The solids fraction may be inert inorganic material such as clays, salts and minerals. Especially problematic are OBS compositions in which the largest solid particles are less than 10 micrometers in diameter, rendering most mechanical equipment such as centrifuges and presses impractical. Many OBS compositions are considered waste byproducts today, where further extraction of hydrocarbons is no longer practical. Hydrocarbon content in waste OBS compositions can range from about 5 percent to about 90 percent (weight basis is used herein unless otherwise noted) of the OBS composition, therefore making many OBS compositions ideal for further processing to extract valuable hydrocarbons for recovery and recycling. "Increasing temperature", "heating", "cooling", and "chilling" mean the temperature of a stream is increased (or decreased) more than an insignificant amount, either 1) indirectly, for example using electrical Joule heating, combustion, cooling in a shell and tube or other heat exchanger, or otherwise, or 2) directly through close tolerance frictional heating or cooling via direct contact spray, 3) both direct and indirect heating (or cooling). "Turbulent" and "sufficiently turbulent" as used herein mean generally having Reynolds number of 2000 or above, or 2500 or above, or 3000 or above, or 4000 or above.

Where mechanical separation can be applied to OBS compositions, typically two or three separated components are generated where at least one component is a non-liquid containing solid with some quantity of the residual liquids. This semi-solid has the physical characteristics of sludge. Sludge is a heavy, viscous semi-solid material that contains similar components of slurry but with higher solids content. Sludge is generated from numerous sources, such as: oil refining; mud brought up by a mining drill; precipitate in a sewage tank; sediment in a steam boiler or crankcase, and other sources.

Technologies for treating or disposing of slurries and/or sludges were summarized in assignee's published WO2014113894, incorporated herein by reference in its entirety, and include use of traditional equipment such as simple settling basins, clarifiers, filter presses, belt presses, centrifuges, and the like for water and solids slurries and sludges. However, where the solids are fine (less than about 10 micrometers in diameter, and especially less than 1 micrometer), coagulants and/or flocculants may be required with these technologies to effectively increase the size of the solids so that settling using gravitation force or centrifugal force can generate a byproduct with as little water as possible. When the slurry or sludge contains oil, water and solids, processing may be more complex. Processing objectives may be several, such as recovery of oil, recovery of solids (such as catalyst fines or metals), maximum volume reduction, or some combination of these. Complexity may be further increased with the liquid component where the oil and water are stable emulsions. Furthermore, the solid particles may be fine and/or low density, and may contribute to forming a "complex emulsion" of these solids, oil, and water. The use of traditional coagulants and flocculants may not work well in OBS compositions. Demulsifier chemicals ("demulsifiers") may be required to separate the oil and water components; however, demulsifiers may not work in all cases, particularly when the slurry is a homogenized highly stable emulsion. For OBS compositions that are "loosely" emulsified, a combination of surfactants, coagulants and flocculants along with centrifugal forces may result in a good recovery of oil and volume reduction, however a waste sludge or cake with relatively high amount of solids is generated which requires further disposal or processing.

Processing options of the waste sludge from OBS compositions may be most effective when the valuable components, typically oil, but in some cases oil and/or solids, can be recovered. This may be accomplished using evaporative technologies referred to as thermal desorption followed by condensation. When the feed slurry or sludge contains fine solids that cannot be separated using mechanical forces or combined chemical and mechanical forces, the feed slurry or sludge sees no volume reduction. Disposal options, such as salt caverns and incineration may be utilized but suffer similar drawbacks as previously mentioned. Although OBS compositions may be processed using known thermal desorption technology, in known methods the composition must be fed directly to the equipment. In this case, significant oil and water remain in the feed OBS composition, and the removal of the oil and water through volatilization requires significant amounts of energy in addition to the careful management of hydrocarbon vapors at elevated temperatures.

Recovery of hydrocarbons from non-inert and inert solids has been proposed in several patent documents for application in the plastics art, oil refining art, shale retorting art, and the like, however, they are typically selected from filtration, drying, extraction, centrifugation, calcining and other separation methods, and therefore either do not work well and/or require inordinate amounts of energy for the amount of oil or solids obtained. Fines are a contaminant that impacts the quality of the recovered oil that is typically a primary driver in using thermal desorption due to the high value of the recovered oil. The methods and systems of this disclosure effectively manage these fine solids in the most cost effective, energy efficient and the simplest way possible with the least amount of equipment, instrumentation and rotating equipment.

Certain methods and systems of this disclosure utilize a unique direct contact condensing system that does not utilize separated water or separated oil from the condensation system. These embodiments eliminate the need for any gravity based separation process that is used as the quenching fluid for condensing the vapors. In addition, the these embodiments are capable of handling a very wide range of the amount of carryover over fine solids in the vapor phase and wide composition range of oil/water/fine solids sludge.

Certain short-hand terms are used in describing the methods and systems of this disclosure, and are summarized here:
O—oil
CO—clean oil, sometimes referred to as "Recovered Oil"
W—water, sometimes referred to as "Recovered Water"
S—solids
RWS—rewetted solids
CW—clean water
RL—rag layer (difficult to break emulsion of oil, water, and fines)
SL—sludge (may be oil-based, water-based, or O/W-based)
OBS—oil-based slurry (one of the many feeds in feed pipeline or vessel 2)
OWS—oil/water/solids
OWSL—oil/water sludge
HOSL—high oil content sludge
LOSL—low oil content sludge
WWSL—low oil sludge, some water
HWLOSL—high water, low oil sludge
RFE—recovered fluid emulsion
RSRFE—reduced solids recovered fluid emulsion.

Figure 1:
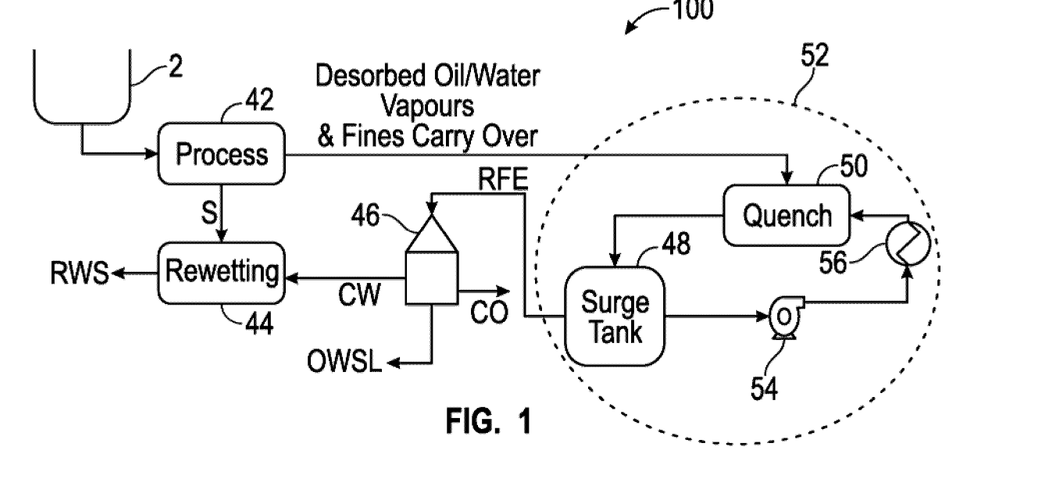
FIGS. 1-6 are schematic process flow diagrams of six method and system embodiments in accordance with the present disclosure.

Referring now to the drawings, where same reference numerals and the above short-hand designations are used in different figures to call out the same components and/or streams, FIG. 1 illustrates schematically embodiment 100, including a treated solids rewetting vessel 44 (which could either be a separate vessel or a chamber connected to the desorption unit) fluidly connected to a thermal desorption unit 42, which could be a turbulent vacuum thermal desorption unit such as developed by assignee and disclosed in WO2014113894, or a conventional thermal desorption unit. Treated solids rewetting vessel 44 is fluidly connected via a clean water conduit CW to a clean water outlet of the one or more disc stack centrifuges 46, and an OWSL conduit fluidly connecting an OWSL outlet of the one or more disc stack centrifuges 46 with the feed vessel or pipeline 2 for the thermal desorption unit 42. In operation the method includes routing a minor portion of the primary circulating surge OWS emulsion from surge tank or vessel 48 of the RFC condensing sub-unit 52 (defined herein) to one or more disc stack centrifuges 46, wherein if there are more than one disc stack centrifuge they are operated in parallel, series, or combination thereof, producing a CO stream, a OWSL stream, and a CW stream, and routing the CW stream to treated solids rewetting vessel 44 and routing the OWSL stream from the one or more disc stack centrifuges 46 to combine with the feed composition in vessel or pipeline 2.

An important feature of embodiment 100, and indeed embodiments 200, 300, 400, 500, and 600 illustrated schematically in FIGS. 1-6, is the Recovered Fluid Condenser sub-unit indicated by the dashed circle 52 in these figures, sometimes referred to simply as the "recovered fluid condenser" or "RFC", and therefore the methods or processes herein may be referred to as RFC processes. Recovered fluid condenser 52 includes a quench vessel 50, which could either be one or more eductors, one or more direct contact spray condensers, or combination thereof (such as one eductor and one direct contact spray condenser). In the case of an eductor, the eductor operates using as a motive fluid a cooled OWS emulsion, sometimes referred to herein as the RFE (recovered fluid emulsion). Because of this the systems and methods described herein in FIGS. 1-6 may be referred to as RFE processes. Recovered fluid condenser sub-unit 52 further includes surge tank 48 (could be one or multiple vessels, or a single vessel with multiple compartments), an RFC circulation centrifugal pump 54, and an indirect heat transfer RFC heat exchanger 56, which may employ chilled water or other cooling heat transfer fluid. An important point to note is that, contrary to known methods and systems, the recovered fluid is not separated in the RFC sub-unit 52. In fact, an emulsion is used to directly contact the oil/water/fines vapor stream routed from the thermal desorption unit and condense the entire stream.

Figure 2:
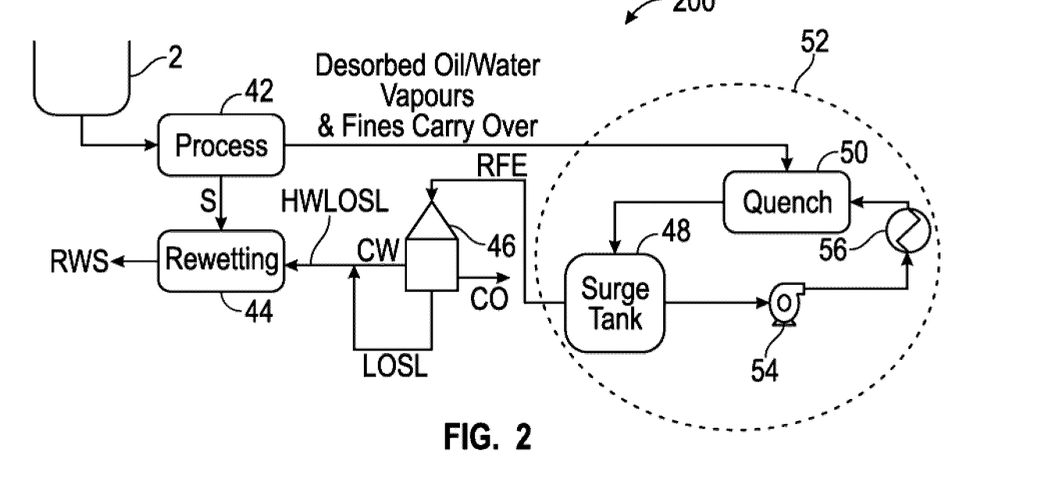

FIG. 2 illustrates schematically a method and system embodiment 200 similar to embodiment 100 illustrated schematically in FIG. 1, the primary difference being that the OWSL from the one or more disc stack centrifuges 46 is instead a LOSL, and this LOSL stream is combined with the CW stream to form a HWLOSL stream that is routed via a HWLOSL conduit to treated solids rewetting unit 44 to form RWS. In operation, method 200 includes routing a minor portion of the surge OWS emulsion to one or more disc stack centrifuges 46, wherein if there are more than one disc stack centrifuge they are operated in parallel, series, or combination thereof, producing a CO stream, a LOSL stream, and a CW, combining the CW stream and the LOSL stream to form the HWLOSL stream, and routing the HWOWSL stream to treated solids rewetting vessel 44 (auger or pug mill) to form the RWS stream.

Figure 3:
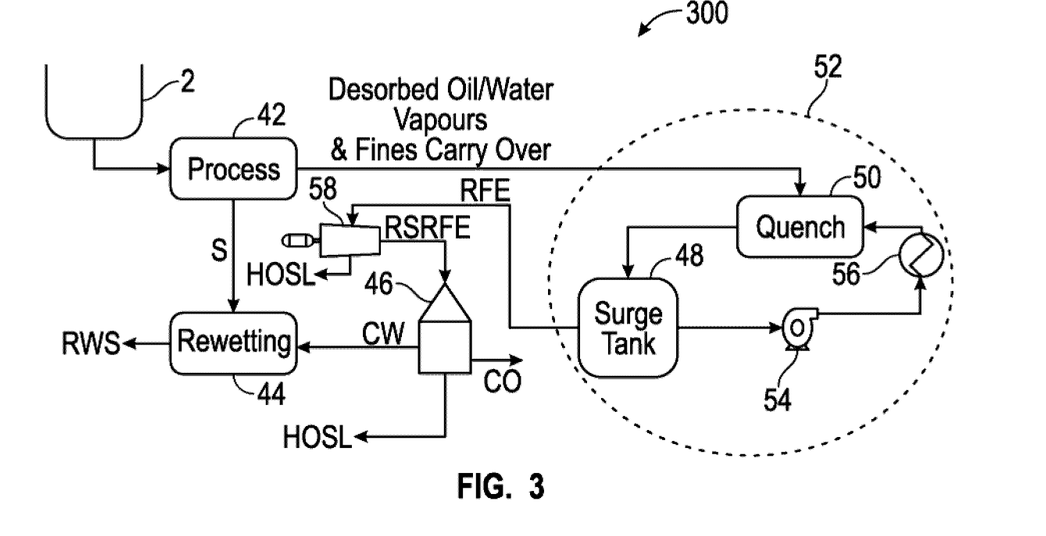

FIG. 3 illustrates schematically a method and system embodiment 300 wherein the OWS separation unit comprises one or more decanting centrifuges 58 fluidly connected in parallel, series, or combination thereof, and fluidly connected upstream of the one or more disc stack centrifuges 46. Method and system embodiment 300 comprises a treated solids rewetting vessel 44 fluidly connected via a CW conduit to a CW outlet of the one or more disc stack centrifuges 46, a first HOSL conduit fluidly connecting an HOSL outlet of the one or more disc stack centrifuges 46 with a feed vessel 2 for the thermal desorption unit 42, and a second HOSL conduit fluidly connecting an HOSL outlet of the one or more decanting centrifuges 58 with feed vessel 2 for the thermal desorption unit 42. In operation, method of embodiment 300 includes routing a minor portion of the surge OWS emulsion to one or more decanting centrifuges 58, producing a first HOSL stream and a RSRFE stream, and feeding the RSRFE stream to one or more disc stack centrifuges 46, wherein if there are more than one disc stack centrifuge they are operated in parallel, series, or combination thereof, producing a CO stream, a second HOSL stream, a CO stream, and a CW stream, and routing the CW stream to treated solids rewetting vessel 44 (auger or pug mill) to form the RWS stream.

Figure 4:
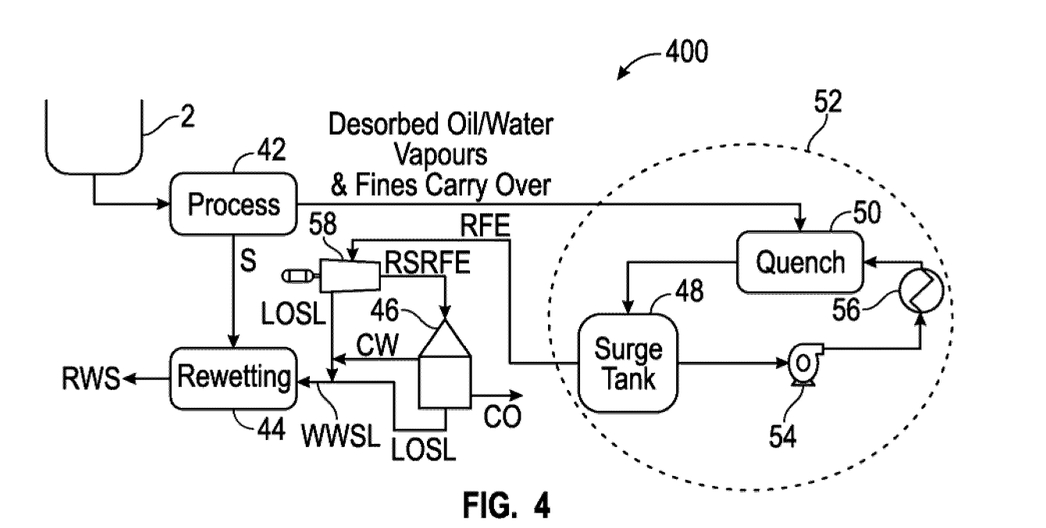

FIG. 4 illustrates schematically a method and system embodiment 400 including a treated solids rewetting vessel 44 fluidly connected via a WWSL conduit to a LOSL outlet of the one or more disc stack centrifuges 46, a CW conduit fluidly connecting a CW outlet of the one or more disc stack centrifuges 46 with the WWSL conduit, a LOSL conduit fluidly connecting an LOSL outlet of the one or more decanting centrifuges 58 with the WWSL conduit, and a RSRFE conduit fluidly connecting a RSRFE outlet of the one or more decanting centrifuges 58 with a RSRFE inlet of the one or more disc stack centrifuges 46. In operation, method embodiment 400 includes routing a minor portion of the RFE to the one or more decanting centrifuges 46, producing a first LOSL stream and the RSRFE stream, and feeding the RSRFE to the one or more disc stack centrifuges 46, wherein if there are more than one disc stack centrifuge they are operated in parallel, series, or combination thereof, producing a CO stream, a second LOSL stream, and a CW stream, combining the CW stream and the first and second LOSL streams to form a WWSL stream, and routing the WWSL stream to a treated solids rewetting vessel 44 (auger or pug mill).

Figure 5:
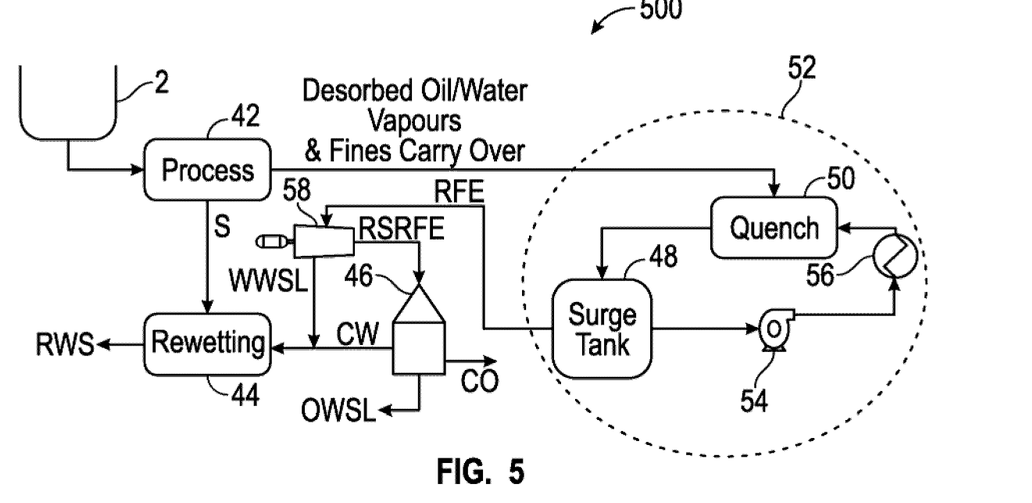

FIG. 5 illustrates schematically a method and system embodiment 500 including a treated solids rewetting vessel 44 fluidly connected via a CW conduit to a CW outlet of the one or more disc stack centrifuges 46, a WWSL conduit fluidly connecting a WWSL outlet of the one or more decanting centrifuges 58 with the CW conduit, and a OWSL conduit fluidly connecting an OWSL outlet of the one or more disc stack centrifuges 46 with feed vessel 2 for thermal desorption unit 42. In operation, method embodiment 1000 includes routing a minor portion of the RFE to one or more decanting centrifuges 58, producing a first WWSL stream and a RSRFE stream, and feeding the RSRFE stream to one or more disc stack centrifuges 46, wherein if there are more than one disc stack centrifuge they are operated in parallel, series, or combination thereof, producing a CO stream, a OWSL stream, and a CW stream, and combining the CW stream with the WWSL stream to form a second WWSL stream, and routing the second WWSL stream to a treated solids rewetting vessel 44 (auger or pug mill) to form the RWS stream, and routing the OWSL stream from the one or more disc stack centrifuges 46 to feed vessel or pipeline 2.

Figure 6:
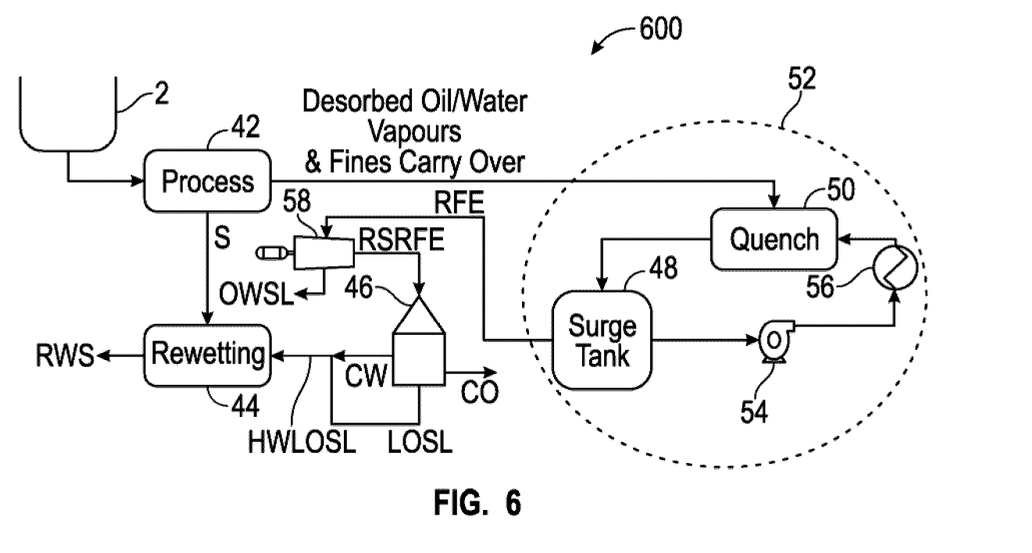

FIG. 6 illustrates schematically a method and system embodiment 600 including a treated solids rewetting vessel 44 fluidly connected via a HWLOSL conduit to a LOSL outlet of the one or more disc stack centrifuges 46, a CW conduit fluidly connecting a CW outlet of the one or more disc stack centrifuges 46 with the HWLOSL conduit, and a OWSL conduit fluidly connecting an OWSL outlet of the one or more decanting centrifuges 58 with feed vessel 2 for thermal desorption unit 42. In operation, method embodiment 600 comprises routing a minor portion of the surge OWS emulsion as the RFE to one or more decanting centrifuges 46, producing an OWSL stream and a RSRFE stream, and feeding the RSRFE stream to the one or more disc stack centrifuges 46, wherein if there are more than one disc stack centrifuge they are operated in parallel, series, or combination thereof, producing a CO stream, a LOSL stream, and a CW stream, combining the CW stream with the LOSL stream to form the HWLOSL stream, routing the HWLOSL stream to treated solids rewetting vessel 44 (auger or pug mill), and routing the OWSL stream from the one or more decanting centrifuges 58 to combine with the feed composition in feed pipeline or vessel 2.

Figure 7:
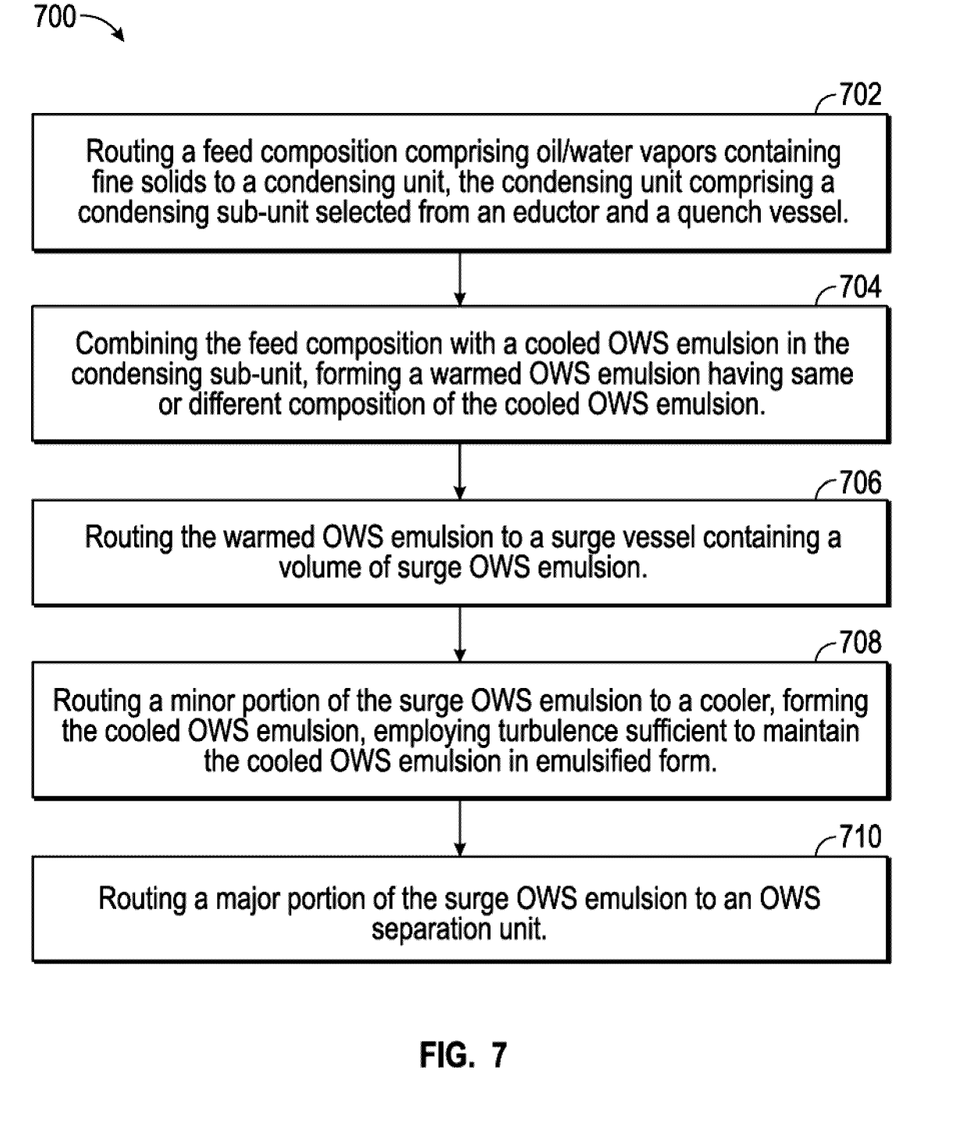
FIGS. 7 and 8 are logic diagrams of two methods in accordance with the present disclosure.
Figure 8:
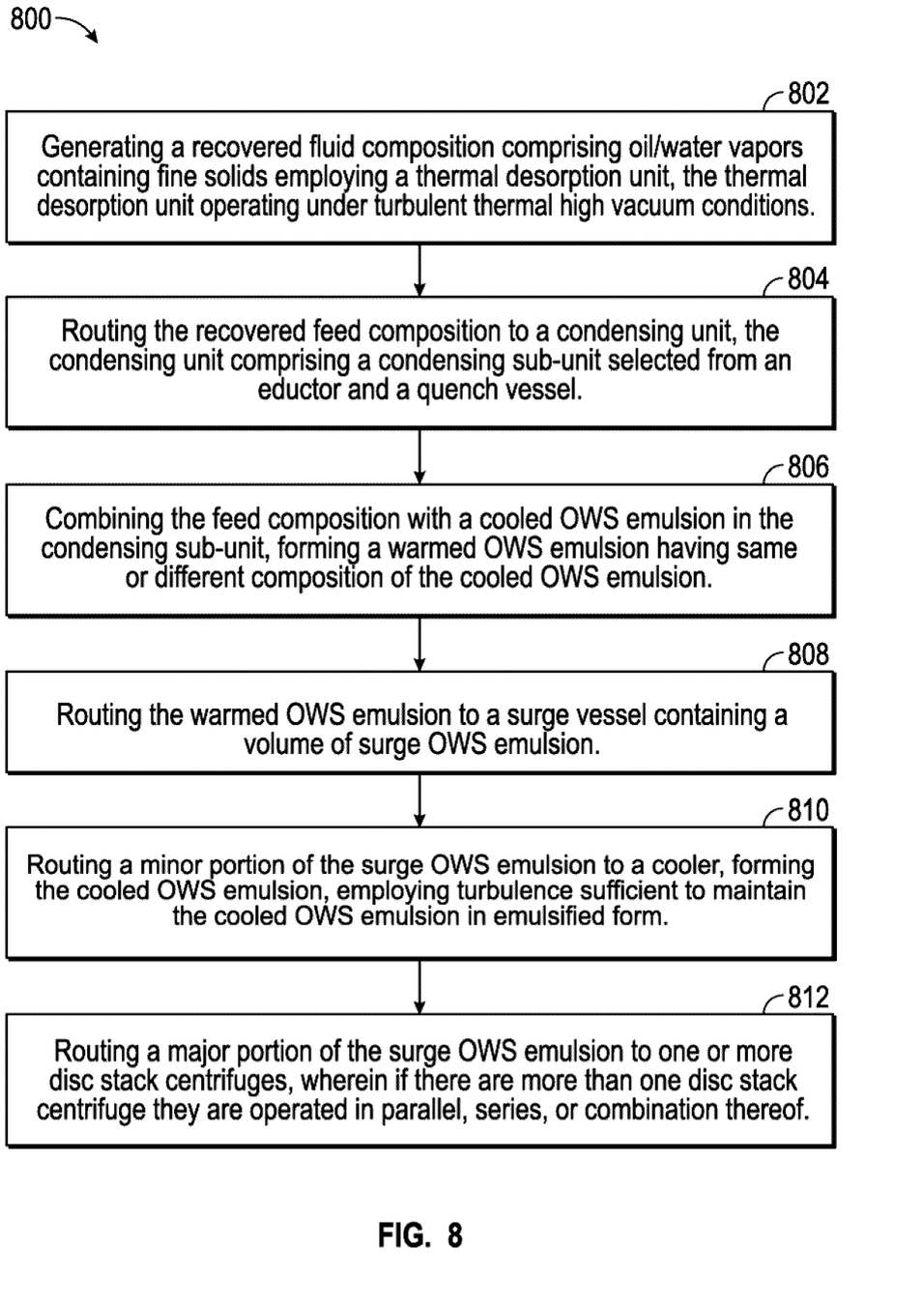

FIGS. 7 and 8 are logic diagrams of two method embodiments 700 and 800 in accordance with the present disclosure. Method embodiment 700 comprises routing a feed composition comprising or consisting essentially of oil/water vapors containing fine solids to a condensing unit, the condensing unit comprising a condensing sub-unit selected from an eductor and a quench vessel, box 702. Method embodiment 700 further includes combining the feed composition with a cooled OWS emulsion in the condensing sub-unit, forming a warmed OWS emulsion having same or different composition of the cooled OWS emulsion, box 704. Method embodiment 700 further includes routing the warmed OWS emulsion to a surge vessel containing a volume of surge OWS emulsion, box 706. Method embodiment 700 further includes routing a major portion of the surge OWS emulsion to a heat exchanger, forming the cooled OWS emulsion, employing shear and/or turbulence sufficient to maintain the cooled OWS emulsion in emulsified form, box 708. Method embodiment 700 further includes routing a minor portion of the surge OWS emulsion circulating stream to an OWS separation unit, box 710.

Method embodiment 800 comprises generating a recovered fluid composition comprising or consisting essentially of oil/water vapors containing fine solids employing a thermal desorption unit, the thermal desorption unit operating under turbulent thermal high vacuum conditions, box 802. Method embodiment 800 further includes routing the recovered fluid composition to a condensing unit, the condensing unit comprising a condensing sub-unit selected from an eductor and a quench vessel, box 804. Method embodiment 800 further includes combining the feed composition with a cooled OWS emulsion in the condensing sub-unit, forming a warmed OWS emulsion having same or different composition of the cooled OWS emulsion, box 806. Method embodiment 800 further includes routing the warmed OWS emulsion to a surge vessel containing a volume of surge OWS emulsion, box 808, routing a major portion of the surge OWS emulsion to a heat exchanger, forming the cooled OWS emulsion, employing turbulence sufficient to maintain the cooled OWS emulsion in emulsified form, box 810. Method embodiment 800 further includes routing a minor portion of the surge OWS emulsion circulating stream to one or more disc stack centrifuges, wherein if there are more than one disc stack centrifuge they are operated in parallel, series, or combination thereof, box 812.

The following is a non-limiting summary of some of the OWS vapor streams that may be treated using systems and methods of the present disclosure, with no particular emphasis on any one thermal desorption apparatus and method, one of which may be that described in assignee's WO2014113894.

OWS vapor streams generated from waste oils, slop oil from refineries, oil sludge from lagoons and used emulsions emanating from drainages, residues and cleaning processes, especially cleaning oil tank bottoms. Most of these wastes contain high quantities of recoverable oil ranging from 10-90 percent with the remaining water and solids. When the solids are dense and large in diameter (typically greater than 1 micrometer, or greater than 10 micrometer in largest dimension), treatment using centrifugal technology may be economical, however the treatment produces a solids stream containing oil and water. This solids stream is a sludge that must be further processed to recover the remaining valuable oil and water. When the solids are less dense and small in diameter or largest dimension (typically less than 10 micrometers, or less than 1 micrometer), treatment using centrifugal technology is not possible even when chemicals such as demulsifiers, coagulants and flocculants are used, particularly in the case where oil content in the feed is high. Residual oil in the solids/sludge may be recovered by use of a thermal extraction unit, and systems and methods described herein.

Residual oil and metals in the solids/sludge may be recovered from washing liquids used in the metal-processing industry by a thermal extraction unit and systems and methods of the present disclosure.

Lubricating and hydraulic oils may be recovered from water and dirt particles less than 10 micrometers in maximum diameter, in some cases less than 1 micrometer, employing a thermal extraction unit modified using systems and methods of the present disclosure.

Coolant emulsions or coolant oils may be recovered from compositions comprising solid impurities and water employing a thermal extraction unit modified using systems and methods of the present disclosure. Coolant emulsions may be composed of different components, such as emulsifiers, stabilizers, corrosion protection additives, high-pressure additives and mineral oil components—complex mixtures that may experience bacterial contamination and decay.

Diesel engines or turbines for generating electricity that employ fuel oil and lube oils may employ centrifuges to purify the oils. These centrifuges generate sludge. Residual oil and solids in the solids/sludge may be recovered by a thermal desorption unit modified by downstream systems and methods of the present disclosure, optionally directly integrated into production.

Contaminated oil drilling fluids and drill cuttings may be a considerable potential hazard to sensitive marine ecosystems. Drilling fluids are viscous emulsions that are circulated through the drilling pipe during drilling for crude oil or gas in order to pump the drill cuttings to the surface for processing. These emulsions may rapidly become contaminated with mud, salt water and oil residues. Towards the end of the drilling process several waste streams are generated, including a spent drilling fluid stream, oil-contaminated drill cuttings, and contaminated water from tank clean up operations.

Spent drilling fluids are an oil based slurry that typically contain clay and barite fine particles less than 10 micrometers in largest dimension, and ranging from about 5 to about 60 percent solids (wt. percent) with the remaining oil and brine in viscous emulsion. These compositions may be outside the range of centrifuges to effectively separate the valuable oil. Contaminated drill cuttings form a sludge/semi-solid that typically contains from about 5 to about 60 percent (wt. percent) oil and brine emulsion with the remaining solid drill cuttings generated from the well bore. These compositions are generally not a suitable feedstock for a centrifuge. Both spent drilling fluids and contaminated drill cuttings are challenging wastes to manage due to limited technologies available to separate the valuable oil from the solids fraction. Only a thermal desorption based technology is capable of processing these waste streams. Residual oil and solids in the solids/sludge may be recovered by a thermal desorption system and method, optionally truck-, rig-, or skid-mounted, modified by a method and system of the present disclosure.

During crude oil pumping or drilling, so-called "drain water" or "slop water" may accumulate. This water may be polluted to a greater or lesser extent with oil and fine solids and may not be discharged into the sea from offshore production platforms, drilling platforms, FPSOs, or FSOs (floating storage and off-loading vessels) until it has undergone an appropriate deoiling process. This drain or slop water is deoiled typically using a centrifuge to the legally specified extent to guarantee that the marine ecosystem is protected. The deoiling centrifuge generates a sludge consisting of the fines in the drain/slop water and residual oil and water. This sludge waste stream must be handled, stored and disposed at great expense. Residual oil and solids in the solids/sludge may be recovered by a thermal desorption system and method, optionally truck-, rig-, or skid-mounted, modified by a method and system of the present disclosure.

In order to make petrol (gasoline) or other fuels from heavy fractions of crude oil, refineries may employ a catalytic cracking ("cat cracking") process that employs a catalyst. "Cat fines" may comprise silicon and aluminum compounds that are required as catalysts in cat cracking processes. As cat fines may be extremely damaging to engines, these substances must be reliably removed from the produced fuels making it possible to feed certain cat fines straight back into the catalyzing process. Cat cracking takes place in special cracking towers at a temperature of around 500° C. After the conversion, there is then a large quantity of cat fines in both the residues of the cracking towers and the distilled fuel products. For those catalyst particles that are of large size and density, typically a settling clarifier and centrifuge may be used, however a waste sludge/solids stream may be generated which contains significant amount of valuable hydrocarbons. For those catalysts that are too fine for a centrifuge, another separation process is required. Also, catalysts become spent over time due to fouling from carbonization that blocks the catalytic reaction from occurring on the catalyst surface. Valuable hydrocarbons and catalyst solids in the solids/sludge may be recovered by a thermal desorption system and method, modified by a method and system of the present disclosure.

Varied businesses may produce many different types of paint and ink waste in their manufacturing processes or as a result of the services they provide. Some may contain toxic metals at or above legal limits. Examples of paint and ink wastes that may be hazardous include unusable liquid paints, stains, or inks; paint-thinner wastes of all types; paint spray-booth filters and arrestors; scrapings from paint booth walls and floors; paint-stripping waste; rags containing paint, ink, and/or solvent; sludge from distilling paint-thinner waste; and blanket and fountain washes and other cleanup materials. Most paint and ink wastes contain little water and comprise low and high boiling point hydrocarbons and relatively low amount of solids (less than 50 wt. percent). Solvents generally used during cleanup may be hazardous wastes as well as air pollutants. Wastes improperly managed may harm human health and/or the environment in addition to the expense of disposal of the paint and ink slurries and sludges. Solvents and residual solids in paint and ink wastes may be recovered by a thermal desorption system and method, modified by a method and system of the present disclosure.

Contaminated oil drilling fluids and drill cuttings may be a considerable potential hazard to sensitive marine ecosystems. Drilling fluids are viscous emulsions that are circulated through the drilling pipe during drilling for crude oil or gas in order to pump the drill cuttings to the surface for processing. These emulsions may rapidly become contaminated with mud, salt water and oil residues. Towards the end of the drilling process several waste streams are generated, including a spent drilling fluid stream, oil-contaminated drill cuttings, and contaminated water from tank clean up operations. Spent drilling fluids are an oil based slurry that typically contain clay and barite fine particles less than 10 micrometers in largest dimension, and ranging from about 5 to about 60 percent solids (wt. percent) with the remaining oil and brine in viscous emulsion. These compositions may be outside the range of centrifuges to effectively separate the valuable oil. Contaminated drill cuttings form a sludge/semi-solid that typically contains from about 5 to about 60 percent (wt. percent) oil and brine emulsion with the remaining solid drill cuttings generated from the well bore. These compositions are generally not a suitable feedstock for a centrifuge. Both spent drilling fluids and contaminated drill cuttings are challenging wastes to manage due to limited technologies available to separate the valuable oil from the solids fraction. Only a thermal desorption based technology is capable of processing these waste streams. Residual oil and solids in the solids/sludge may be recovered by a thermal desorption system and method, optionally truck-, rig-, or skid-mounted, modified by a method and system of the present disclosure.

Drilling Rig Integrated Condensing System

Figure 9:
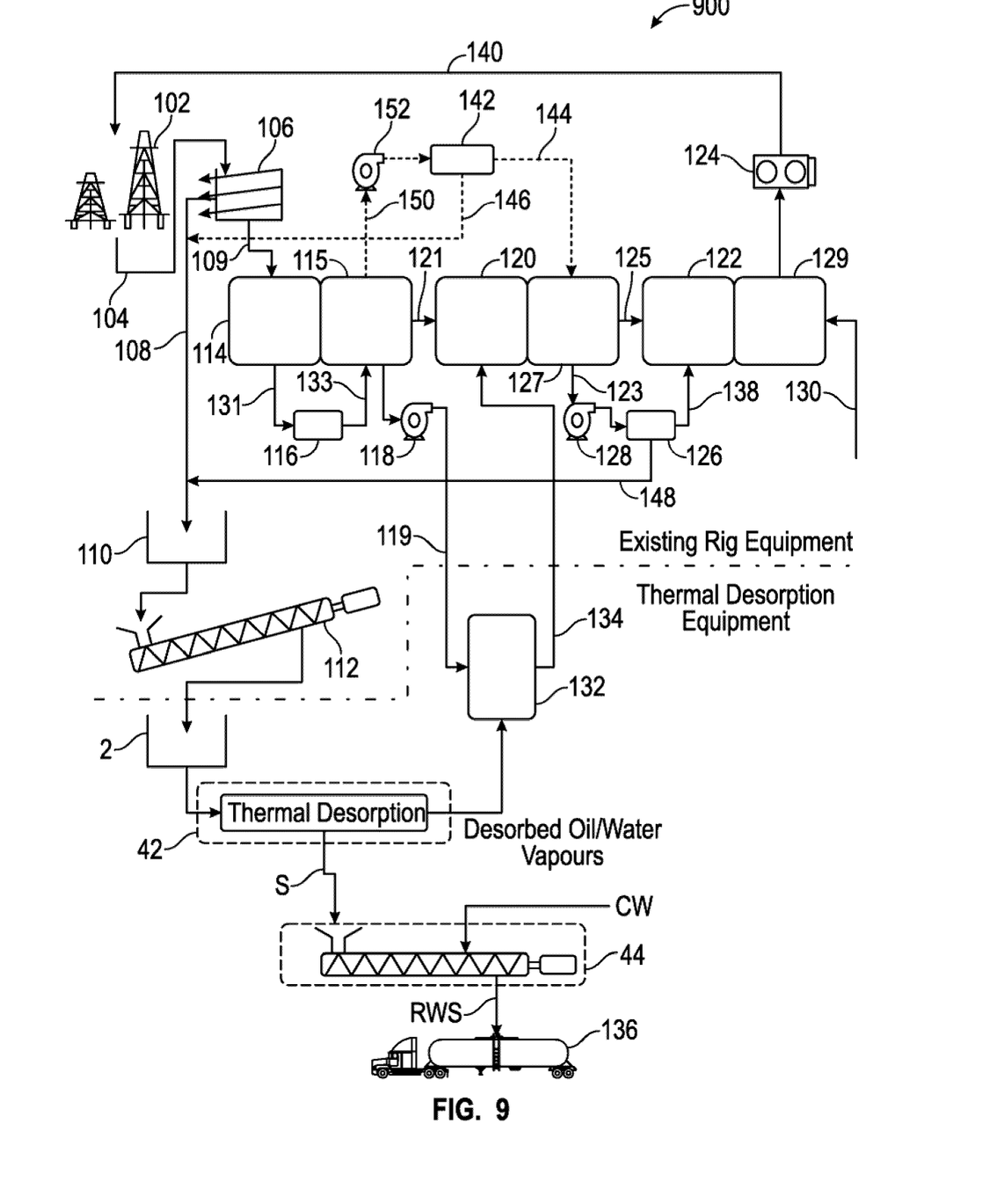
FIG. 9 is a schematic process flow diagram of a system and method of the present disclosure integrated with a drilling operation.

In certain embodiments, an RFC system and process of the present disclosure may be integrated into a drilling rig operation, as illustrated in the process flow diagram of embodiment 900 illustrated schematically in FIG. 9, which includes a drilling rig 102 from which a flow 104 of drilling fluid and cuttings from the borehole emanate. A heat and mass balance for embodiment 900 is presented in Table 1. Every drilling operation utilizes drilling rig surface fluid processing system to provide a sufficient volume of drilling fluid. The drilling fluid is circulated continuously through the drill stem, well bore annulus where drill cuttings are lifted and transferred to the solids control equipment at the surface where the drilling fluid is reconditioned, if necessary and pumped down the drill stem to complete the loop. The larger solids are separated from stream 104 in a shaker 106 and form a stream of oily, watery drill cuttings 108, which are routed to a solids cutting bin 110 and feeder auger 112 that feeds the oily, watery drill cuttings to thermal desorption unit 42. From shaker 106 a stream of drilling fluid 109 (including some fine cuttings solids and barite, if drilling fluid is weighted) is routed to one or more upstream mud tanks 114, 115, which could be a single tank with a series of compartments.

Still referring to FIG. 9, a composition comprising drilling fluid with some fine cuttings solids may flow through a degasser feed line 131 to a degasser 116, which produces a degassed drilling fluid stream that is routed back to mud tank 115 though a conduit 133. A portion of this degassed drilling fluid is pumped via a pump 118 through a conduit 119 and used as an eductor motive fluid or quench fluid in a unit 132, depending on the thermal desorption process used. This unit produces a stream comprising or consisting essentially of relatively low mass flow of condensed oil and water vapor further including a relatively large mass flow of degassed drilling fluid, which is routed via conduit 134 back to an intermediate mud tank 120. Degassed, reduced water drilling fluid stream 121 may also be fed to mud tank 120. Intermediate mud tank 120 feeds or is connected to another intermediate mud tank 127, where a relatively low portion of the contents of intermediate mud tank 127, stream 123, is routed via a centrifuge feed pump 128 to a rig centrifuge 126, producing a recovered drilling fluid stream 138 and a recovered solids stream 148, the latter routed back to solids cutting bin 110. Recovered drilling fluid stream 138 is routed to a downstream mud tank 122, along with stream 125, which includes stream 134. Downstream mud tank 122 is fluidly connected to another downstream mud tank 129 (or another compartment of mud tank 122) where any make up chemicals may be added via one or more conduits 130. A stream of treated, recovered drilling fluid 140 is pumped via rig pump 124 back to the borehole from mud tank 129.

Still referring to FIG. 9 and embodiment 900, a slip stream 150 of drilling fluid with solids may be pumped via a pump 152 to one or more rig hydrocyclones 142, producing a recovered drilling fluid stream 144 that may be routed to intermediate mud tank 127, and a fine solids underflow stream 146 that may be routed to solids stream 108. Also, referring to the bottom portion of FIG. 9, which represents the thermal desorption equipment (below dotted/dashed line), a rewetted solids stream RWS may be fed to trucks or other equipment 136 for disposal.

The active drilling fluid system volume must match the volume of the well bore volume drilled, account for loss to formation, minimize batch mixing volume, loss of drilling fluid with discarded solids along with contingency. Approximately 2 barrels of drilling fluid is discarded for every barrel of solids drilled. The known surface systems also comprise high flow pumps to avoid settling of solids in pipes, well bore and equipment. Typical active drilling fluid system volumes are dependent upon well construction, onshore vs. offshore, and depths, ranging from about 500-4000 bbls (about 80-636 m$^3$). Actual drilling fluid volume required for the duration of the well may be 1.5 to 3 times (or more) than the active drilling fluid volume, the actual multiple being dependent upon numerous factors such as fluid losses to the formation, fluid carried with drill cuttings and solids control equipment, loss circulation events, formation types, etc. Typical circulating flow rate of drilling fluid ranges from about 700-1500 gpm (111-238 m$^3$/h).

TABLE 1

Heat and Mass Balance for FIG. 9

| Stream No. | Stream Name | Flow Rate (Kg/hr.) | Temp (C.) | Wt. % S |
|---|---|---|---|---|
| 104 | Drilling fluid & cutting from borehole | O = 138,622<br>W = 27,724<br>S = 46,918<br>T = 213,265 | 30 | 22 |
| 2 | Thermal desorption unit feed | O = 225<br>W = 150<br>S = 1,125<br>T = 1,500 | | |
| RWS | Rewetted solids (treated solids for disposal) | O < 10<br>W < 100<br>S > 1,090<br>T = 1,200 | | |
| 140 | Treated, recovered drilling fluid | O = 138,147<br>W = 27,874<br>S = 45,812<br>T = 212,542 | 32.2 | 21.55 |
| 119 | Degassed drilling fluid & water | O = 73,392<br>W = 14,786<br>S = 25,023<br>T = 113,741 | | |
| 134 | Condensed oil & water vapors, & degassed drilling fluids plus solids fines | O = 74,157<br>W = 14,936<br>S = 25,051<br>T = 114,144 | | |

When drilling with oil or synthetic based un-weighted drilling fluids, solids control equipment such as one or more vibrating shakers 106 and one or more rig centrifuges 126 are commonly used to remove unwanted solids such as drill cuttings and low-density solids. Vibrating shakers remove relatively large size particles >100 micrometers, and centrifuges remove particles >10 micrometers, more particularly low-density solids. In prior art drilling operations, these solids can build up in the circulating active drilling fluid system over time and therefore must be removed to maintain the drilling fluid properties within specification. The discarded solids can be processed with thermal desorption equipment resulting in separated oil, water and oil free solids.

An advantage of embodiments such as embodiment 900 illustrated schematically in FIG. 9 is that the oil and water streams, particularly the oil stream, may used to make additional drilling fluid. In previously known drilling operations, thermal desorption equipment is typically utilized as a standalone equipment from a drilling rig. In other words, other than providing the feed stream to the thermal desorption equipment, there is no other direct connection to the drilling rig equipment. In particular, all condensing equipment and fluids are contained within the thermal desorption system. In most previously known cases, the drilling wastes are stockpiled and processed after the drilling rig has departed from the drill site.

In accordance with the present disclosure, and as illustrated schematically in embodiment 900 of FIG. 9, in contrast to previously known drilling operations, methods, and systems, a portion of the circulating active drilling fluid is used as a condensing fluid to quench and condense the vapors generated from a thermal desorption system. Condensing of vapors may occur in a venturi style scrubber, an eductor as in the case of the thermal desorption methods and systems known under the trade designation as VECTTOR™ (as described in assignee's published WO2014113894), or a simple quench tank with spray nozzles. As described with reference to FIG. 9, drilling fluid composition 119 (a highly stable emulsion consisting of oil/water/solids) may be readily used to condense vapors. Since the oil or synthetic hydrocarbon recovered from the thermal desorption system (assuming little or no cracking) is of the same or very similar type (same fingerprint) as the base oil in the drilling fluid, there is little or no alteration of the circulating active drilling fluid. There is a slight increase in volume of the active drilling fluid due to the recovered oil and water from the condensed vapors. This is beneficial as more volume of drilling fluid is required as the well bore volume increases during drilling to greater depths. Additional make up chemicals such as salts, surfactants and other organic compounds may be added proportionate to the additional oil and water volumes from the thermal desorption as per normal drilling fluid formulations. In most cases, the drilling fluid contains sufficient excess additives to receive the additional oil and water volumes without the immediate need for make up chemicals that may lead to the separation of oil and water from the drilling fluid emulsion.

All thermal desorption systems have a certain amount of fines carryover into the condensation system. These fines are generated from the thermal desorption process from the fines already in the feed but mostly from the attrition of larger particles in the feed. While most of the fines are removed from wet and dry methods such as cyclones and high temperature oil scrubbers, some fines will be carried with the vapor stream. In most cases, the fines content represents a very small fraction of condensed stream, <10% depending upon the efficiency of the fines solids removal equipment. In the example below discussing the TVT (VECTTOR™) process, 28 kg/hr. of fines are carried with the vapors, which subsequently become a part of the drilling fluid. Assuming a drilling fluid at 65%/13%/22% wt % (oil/water/solids) circulating at 750 gpm flow rate at 9.59 pounds per gallon (213,265 kg/hr.), the increase of fines content in the drilling fluid returned to the well is only 0.19% which is insignificant and will not result in any negative rheological properties or increase in chemical consumption to maintain drilling fluid properties. Referring to FIG. 9, if the outlet stream 134 of quenching equipment 132 is returned to intermediate mud tank 120 upstream of rig centrifuge 126, some or all of these fines will be removed. The mass balance shown in Table 1 does not assume any removal of fine solids with rig centrifuge 126 as the fine solids content is already insignificant. However, it should be noted that the fines could accumulate in the circulating drilling fluid active system. To evaluate this case, the concentration of fines will be at the end of the drilling campaign where they will be the maximum. Therefore, the total drilling fluid is made up of the drilling fluid active system plus additional drilling fluid made up on location during the drilling of the well. This is assumed conservatively to be 5,000 bbls (1,006 mT) with 22% wt % solids or 221 mT. Also, assuming a drilling duration of 10 days, the total fines from the TVT system known under the trade designation VECTTOR™ will be 28 kg/hr.×24×10=6.7 mT or 3.0%. Again, this amount of increase is insignificant and does not take into consideration the fines removal with rig centrifuge 126 found on all drilling rigs. It can be expected that the rig centrifuge 126 will remove approximately 50% of the fines, thereby reducing the fines introduction into the active drilling fluid system to 3.4 mT or 1.5%. It is commonly understood and also expected that fine solids will be removed with larger solids at the shaker 106 through piggybacking on larger solids.

Energy in the form of heat is transferred from the condensing of the vapors to the active drilling fluid in the condensing system 132. This will result in a slight increase in temperature of the stream comprising or consisting essentially of relatively low mass flow of condensed oil and water vapor further including a relatively large mass flow of degassed drilling fluid in conduit 134 compared to the temperature of degassed drilling fluid that is pumped via pump 118 through a conduit 119 prior to returning to the well bore. This is generally desirable and beneficial, particularly in cold weather climates where steam heating coils are used to maintain drilling fluid temperatures at great expense. The rise in temperature improves viscosity and rheological properties, reduction in pumping pressure and lower pumping energy costs. However, in some rare cases where temperature increases are not desirable, a simple heat exchanger (fin fan cooler or plate frame or shell tube) may be utilized upstream of quenching equipment 132 if the coolant fluid temperature (typically air or water) is lower than the desired exit temperature (temperature of stream carried by conduit 134) prior to the stream carried by conduit 134 returning to the mud tanks and the well bore as stream 140. The increase in temperature of the drilling fluid will eventually be transferred and lost to the formation which will result in little to no net increase in temperature of the drilling fluid returned to the surface from the well bore. In the example of FIG. 9 and Table 1, a thermal desorption system processing 1500 kg/hr. with a typical 15%/10%/75% wt % Oil/Water/Solids content, the resulting increase in temperature of the drilling fluid is 2.2° C. The rise in temperature for a given drilling fluid flow rate is proportional to the processing rate of the thermal desorption system at a given specific energy of consumption based on the oil/water/solids content of the feed material.

Integration with the rig surface equipment (the equipment illustrated schematically in FIG. 9 above the dotted and dashed line), particularly the shaker equipment 106, provides the benefit of selecting shaker screens with finer mesh. Finer mesh screens are generally desirable as more solids are rejected resulting in lower solids content in the drilling fluid. Removal of solids with a shaker is the most cost effective way of separating solids from drilling fluid. However, selecting finer mesh screens results in loss of valuable drilling fluid that is rejected along with greater amount of solids. When the thermal desorption system is integrated with the rig as illustrated schematically in embodiment 900 of FIG. 9, all solids and fluids are eventually recovered and returned to the active drilling fluid system.

The term "solids" includes solid particulate objects of all shapes, composition (as long as inert under the pressure, thermal and shear and/or turbulent conditions described herein), and morphology. Shapes may include, but are not limited to, spherical, hemispherical, quarterspherical, conical, square, polyhedral, ovoid, saddle-shaped, irregular, random, non-random shapes, featured or featureless shapes, contoured or non-contoured shapes, and the like. Morphologies may include single particles and agglomerates of two or more particles, crystals and non-crystalline solids, amorphous and partially crystalline and partially amorphous solids, nano-particles, nano-spheres, nanotubes, micro-particles, coated particles having one or more full or partial coatings, porous and non-porous solids, and the like. The term "solids", when used in the context of an OBS, includes hydrated chemicals, although the water of hydration will most likely be removed (volatilized) with any hydrocarbons and other water in the feed composition. The term "solids" also includes shaped particles that may be filled or infused with another compound or chemical, such as ceramic spheres filled with another substance. As used herein the term "hydrocarbon" includes compositions comprising molecules of only carbon and hydrogen, as well as compositions comprising molecules of carbon, hydrogen, and other elements, such as halogens, and non-halogens (oxygen, sulfur, nitrogen, and the like), and mixtures and combinations of these. Hydrocarbons may be derived from petroleum, coal tar, oil sands, shales, and plant and other biological sources. Hydrocarbons may be comprised of aliphatic (straight or branched chain paraffinic and/or olefinic) and or cyclic, such as benzene, chlorobenzene, toluene, xylene, and the like. The term "emulsion" includes oil-in-water emulsions, water-in-oil emulsions, and complex emulsions, the latter being where the solids are so fine and charged that the solids become a part of the emulsion.

The term "dissolved solids" means solids that are dissolved in a solvent. Certain feed compositions to thermal desorption process 42 may contain dissolved solids, such as oil product recovered from oil sands using steam assisted gravity drainage (SAGD). The blowdown from evaporators that treat produced water from the SAGD process may have an elevated level of dissolved solids and has been difficult to dispose of. The dissolved solids may be removed by a system and method embodiment of the present disclosure such as described with reference to FIGS. 1-6, or variation thereof. The essentially distilled water can then be re-introduced into the steam generating system. The term "dehydrated dissolved solids" means solids that contain 1% or less of the original solvent.

The phrase "substantially vaporous composition" means compositions comprising about 1 percent or less by weight of fine particles of the inert solids, in certain embodiments about 0.5 percent or less, in certain embodiments about 0.1 percent or less by weight fine particles of the inert solids, and in yet other embodiments a trace or less of inert solids. The substantially vaporous composition may comprise dehydrated dissolved solids if dissolved solids are present in the feed composition to the RFC. The vapors and some or all of the fine particle inert solids (having diameter less than about 10 micrometers, or less than about 1 micrometer) may leave a thermal extraction chamber of the process known under the trade designation VECTTOR™ as separate but comingled physical phases. The phrase "turbulent vacuum thermal conditions in the thermal extraction chamber sufficient to physically transform some or all of the feed composition into the substantially vaporous composition" means that the thermal extraction chamber is at pressure, temperature and turbulence conditions sufficient to volatilize all but the most stubbornly adherent hydrocarbons and water from the solids. Although the amount of hydrocarbons and water volatilized (separated) from feed compositions may vary from system to system, certain systems and methods in accordance with the present disclosure may volatilize about 95 percent or more by weight of the hydrocarbons and water from the feed composition, or about 99 percent or more of the hydrocarbons and water, or about 99.9 percent or more. As used herein the phrase "heated, substantially dry, depleted feed composition" means the solids exiting the thermal extraction chamber, and have about 90 weight percent or more of water and hydrocarbons removed from the feed composition in pipeline or vessel 2, in certain embodiments about 95 percent or more, and in certain exemplary embodiments about 99.9 weight percent or more removed. The phrase "inert solids" means that the solids (excluding dissolved solids) are essentially non-chemically reactive toward other constituents in the feed composition in pipeline or vessel 2 and toward each other, although there may be some small percentage of the solids that chemically react by desorbing water of hydration, or evolved gases that react (for example carbon monoxide reacting with oxygen present to produce carbon dioxide). These latter reactions are considered largely irrelevant to the systems and methods of the present disclosure, although for completeness they should be mentioned, as they may contribute some small heating effect.

Vessels, condensers, heat exchangers, surge vessels, centrifuges, eductors, contactors, mud tanks, pumps, and associated structures, as well as conduits used in transferring materials between different operational units useful in systems and methods of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. In any particular system and method of this disclosure, the type of feed composition being processed by thermal desorption process 42 may influence the geometry, thermal extraction unit configuration, recovered fluid condenser configuration, centrifuges, and associated structural features.

Any thermal desorption method and system, such as rotary kiln, batch drum, auger in tube arrangements and hollow hot oil technologies, where rotational speeds range only from about 2 to about 10 rpm, and more advanced thermal desorption methods and systems such as the process and system known under the trade designation VECTTOR™ as disclosed in assignee's WO2014113894 may be used when integrating a thermal desorption system into a drilling operation or other operation. Table 2 compares the various technologies.

The process and system known under the trade designation VECTTOR™, as more fully described in assignee's WO2014113894, utilizes thermal desorption principals where the extraction chamber may comprise one or more barrel or casing sections made of metal with moderate structural strength that is balanced with high thermal conductivity such as many types of hardened carbon steel. External heating of the thermal extraction barrel (TEB) may be generated via multiple methods ranging from hot oil jacket, combustion flue gases, infrared heating, induction heating, exhaust from electrical generator or electrical resistance heating.

Materials of construction of TEB and screws are generally metallic, although ceramic, composite, or metal-coated materials may be envisioned, as long as they have comparable mechanical and physical properties of comparable metals. For example, screw shafts may be comprised of chromium-molybdenum steel alloys, such as 4140 through-hardened steel. Screw elements may comprise composite materials, for example powder-metallurgically-bonded materials with a Rockwell C hardness ("HRC") of about 60 or above with an operating temperature of 450° C., or through-hardened steels which provide excellent wear resistance. TEB may comprise a base barrel with a replaceable liner made of a hard, through-hardened cast chromium steel with a liner hardness (HRC) of about 57 or above; or a one piece HIP (hot isostatic pressing) replaceable liner comprising NiCrBSi with carbides, and through-hardened; or one piece solid barrel (direct coating) using a brazed hard material layer comprising carbides dispersed in an NiCrB matrix with a hardness (HRC) of about 62 or above and coating thickness ranging from about 1 to about 3 mm.

The feed composition to the thermal desorption unit in one embodiment may comprise from about 4 to about 60 weight percent inert solids, from about 5 to about 75 weight percent water, and from about 5 to about 70 weight percent hydrocarbons. In another embodiment, the feed composition may comprise from about 0 to about 67 weight percent inert solids, from about 31 to about 97 weight percent water, and from about 2 to about 25 weight percent hydrocarbons. In yet another embodiment, the feed composition may comprise from about 0 to about 90 percent inert solids, from about 0 to about 97 weight percent water, and from 0 to about 95 weight percent hydrocarbons.

TABLE 2

Comparison of Thermal Desorption Systems and Methods

| Technology | Application | Time | T (° C.) | Turbulence | Heat Source |
| --- | --- | --- | --- | --- | --- |
| Rotary Kiln | Solid | 30-60 min | Up to 500 | 1-2 rpm Low-med | Flue gas - diesel fuel |
| Hammer Mill | Solid | <1 min | ~300 | 600 rpm Very high | Electric or diesel fuel |
| TPS -Screw in Large Tube | Solid | 20 min | Up to 550 | 2-3 rpm Low | Flue gas - diesel fuel |
| Hot Oil | Solid & some slurry | 30-60 min | <300 | 1-2 rpm Low-med | Flue gas to hot oil -typically diesel fuel |
| Thin Film Evaporators | Only low solids slurry | <1 min | <300 | 100-150 rpm High | Flue gas to hot oil or steam - any fuel |
| VECTTOR ™ - Narrow gap intermeshing screws in reduced P | Solid & slurry | 40 sec Vapors: 0.1 sec | 250-500 with reduced P | 20-200 rpm High | Electric, hot oil, flue gas, induction- line power or diesel fuel for generator |

Examples

A series of tests were conducted using the pilot unit described herein to process drill cuttings and drill cuttings/spent drilling fluid mixture.

Test 1 was conducted by processing conditioned drill cuttings (19%/10%/71% by wt. of O/W/S content) at 25 kg/hr. avg. for 4 hrs. and 40 minutes at typical operating conditions. The starting surge volume of 50 L had a material composition of 65%/32%/4% by wt. O/W/S. The condensed fluid along with any carryover of fines from the cyclones of the unit known under the trade designation VECTTOR™ was continuously circulated throughout the test at 91 L/min. (24 gpm). This resulted in a total of 508 shearing events through the pump and eductor. The final RFE contained 64%/34%/2% by wt. of O/W/S content. All RFE samples up to and including the final 280 min. sample were easily separated and no inseparable emulsion was formed as tested with a lab-scale centrifuge. There was no loss in quenching efficiency or vacuum generation or significant loss of pumping flow rate and pressure by using RFE as a quenching fluid.

Test 2 was conducted by processing the feed material (23%/13%/64% by wt. of O/W/S content) at 35 kg/hr. avg. for 4 hrs. at typical operating conditions. The circulation of the surge volume of 50 L (material from Test 1) and Recovered Fluid along with any carryover of fines from the cyclones of the unit known under the trade designation VECTTOR™ was continuous throughout the test at 91 L/min. (24 gpm). This resulted in a total of 945 shearing events including the shearing from Test 1. The final Recovered Fluid contained 62%/36%/2% by wt. of O/W/S content. All RFE samples up to and including the final 240 min. sample were easily separated and no inseparable emulsion was formed when using the lab-scale centrifuge or disc stack centrifuge.

The high number of shearing events from Tests 1 and 2 provided the worst-case scenario for scale up. The full scale Mobile Pilot Unit circulation pump for the eductor was 1,500 L/min. (400 gpm) and the Surge Tank volume was significantly reduced when compared to a comparable Oil/Water/Sludge Tank volume. Specifically, the Surge Tank volume of 1,000 L was based on 91 shearing events per hour as compared to 945 shearing events in Tests 1 and 2. Therefore, Surge Tank is very conservatively designed. By comparison, a comparable Oil/Water/Sludge separator tank volume with a 20-minute residence time is 30,000 L, 30 times larger than the Surge Tank used by methods and systems of this disclosure.

An independent experienced Westfalia disc stack centrifuge service provider, SJS Machinery in Winterhaven, Fla., U.S.A., was used to perform separation studies of the RFE material generated from the RFC tests. Approximately 80 L of RFE was processed with a SA-1 Westfalia model, which is a common model used for treatability studies, without issue. Multiple processing conditions were tested with the most effective processing rate measured at 1.2 L/min. The separated oil (Recovered Oil) was of very high quality with trace solids and water using a lab-scale centrifuge and visual observations. The separated water (Recovered Water) was also of high quality with trace solids using a lab centrifuge and visual observations. The Recovered Water was of more than sufficient quality as a rewetting fluid for the Treated Solids. The sludge appeared pasty and visually contained relatively low amounts of liquid.

SJS Machinery recommended a Westfalia Model SA-7, which can process 500 L/hr. (with excess capacity) to match the anticipated processing rate of the Prototype Unit. A higher capacity unit may be considered for a 12 hr./day operation with onsite storage as an option. In addition, Alfa Laval AB (Sweden) was also requested to conduct a separation study. Alfa Laval's testing, which was not witnessed but also concluded the same findings, indicated that the Recovered Fluid Emulsion was easily separated with their lab-scale disc stack hot spin centrifuge. Alfa Laval indicated no challenges and their recommended model was OFPX 207, which is capable of processing 900 L/hr.

The tests concluded that the RFC methods are highly effective in generating high quality recovered oil and recovered water that could easily replace virgin base oil. The separated sludge contained sufficiently low amount of oil that allows for rewetting of the treated solids without significantly impacting the residual oil content of the treated solids. In the event that separated sludge contains high amount of oil, the amount of sludge returned will be significantly less than typical gravity based fines settling vessels used in common quenching methods.

The RFC methods and systems are robust as they can tolerate a wide range of oil/water/solids content and a wide range of fine solids carried over from the fines removal equipment such as a cyclone. One of the outputs from an RFC system is a concentrated sludge but it is difficult to predict if the concentrated sludge has oil or water as the continuous liquid phase. Therefore, the final disposition of the concentrated sludge is either returned to the feed of the thermal desorption process for reprocessing or used as rewetting and cooling of the treated solids from the thermal desorption system.

In the event that the amount of fines carry over into the condensation system is excessive, potentially from inefficient fines removal equipment, the excessive fines carry over may result in both a large volume of sludge and higher solids content sludge. In this case, a decanting type centrifuge is recommended to reduce the solids loading to the 3-phase disc stack centrifuge. The reduction of solids to the disc stack centrifuge, which operates at up to 5,000 g's and is sensitive to solids content, will improve the processing capacity and separation efficiency into the oil and water phases.

Those having ordinary skill in this art will appreciate that there are many possible variations of the systems and methods described herein, and will be able to devise alternatives and improvements to those described herein that are nevertheless considered to be within the claims. Although specific embodiments of the disclosure have been described herein in some detail, this has been done solely for the purposes of describing various features and aspects of the methods, systems, apparatus, and combinations, and is not intended to be limiting with respect to their scope. For example, the capacities of the decanting and disc stack centrifuges and of the thermal extraction unit may vary widely and yet still accomplish many of the goals described herein. Methods and systems using more than one disc stack centrifuge, and more than one decanting centrifuge, arranged in a variety of series and parallel configurations, or hybrid configurations (partially in series, partially in parallel) are considered within the scope of the methods and systems of this disclosure.

What is claimed is:
1. A method comprising:
a) routing a feed composition comprising or consisting essentially of oil/water vapors containing fine solids to a condensing unit, the condensing unit comprising a condensing sub-unit selected from the group consisting of an eductor and a quench vessel;
b) combining the feed composition with a cooled oil/water/solids (OWS) emulsion in the condensing sub-unit, forming a warmed OWS emulsion having same or different composition of the cooled OWS emulsion;
c) routing the warmed OWS emulsion to a surge vessel containing a volume of surge OWS emulsion;

d) routing a first portion of the volume of surge OWS emulsion to a heat exchanger, forming the cooled OWS emulsion; and e) routing a second portion of the volume of surge OWS emulsion to an OWS separation unit.

2. The method of claim 1 wherein the feed composition is a recovered fluid composition from a thermal desorption unit.

3. The method of claim 2 comprising generating the recovered fluid composition employing the thermal desorption unit.

4. The method of claim 2 comprising generating the recovered fluid composition employing the thermal desorption unit, wherein the thermal desorption unit operates under turbulent vacuum thermal conditions under high vacuum conditions or under turbulent thermal conditions under positive pressure conditions.

5. The method of claim 1 wherein the routing of the second portion of the volume of surge OWS emulsion to the OWS separation unit comprises routing the second portion of the volume of surge OWS emulsion to one or more disc stack centrifuges, wherein if there are more than one disc stack centrifuge they are operated in parallel, series, or combination thereof.

6. The method of claim 1 wherein the routing of the second portion of the volume of surge OWS emulsion to the OWS separation unit comprises routing the second portion of the volume of surge OWS emulsion to one or more disc stack centrifuges, wherein if there are more than one disc stack centrifuge they are operated in parallel, series, or combination thereof, producing a clean oil stream, an oil/water sludge stream, and a water stream, and routing the water stream to a treated solids rewetting vessel and routing the oil/water sludge stream from the OWS separation unit to combine with the feed composition.

7. The method of claim 1 wherein the routing of the second portion of the volume of surge OWS emulsion to the OWS separation unit comprises routing the second portion of the volume of surge OWS emulsion to one or more disc stack centrifuges, wherein if there are more than one disc stack centrifuge they are operated in parallel, series, or combination thereof, producing a clean oil stream, a low oil content sludge stream, and a water stream, combining the water stream and the low oil content sludge stream to form a high water, low oil sludge stream, and routing the high water, low oil sludge stream to a treated solids rewetting vessel.

8. The method of claim 1 wherein the routing of the second portion of the volume of surge OWS emulsion to the OWS separation unit comprises routing the second portion of the volume of surge OWS emulsion to one or more decanting centrifuges, producing a first high oil content sludge stream and a reduce solids surge OWS emulsion, and feeding the reduced solids surge OWS emulsion to one or more disc stack centrifuges, wherein if there are more than one disc stack centrifuge they are operated in parallel, series, or combination thereof, producing a clean oil stream, a second high oil content sludge stream, and a water stream, and routing the water stream to a treated solids rewetting vessel.

9. The method of claim 1 wherein the routing of the second portion of the volume of surge OWS emulsion to the OWS separation unit comprises routing a minor portion of the volume of surge OWS emulsion to one or more decanting centrifuges, producing a first low oil content sludge stream and a reduced solids recovered fluid emulsion stream, and feeding the reduced solids recovered fluid emulsion stream to one or more disc stack centrifuges, wherein if there are more than one disc stack centrifuge they are operated in parallel, series, or combination thereof, producing a clean oil stream, a second low oil content sludge stream, and a clean water stream, combining the clean water stream and the first and second low oil content sludge streams to form a low oil sludge, some water stream, and routing the low oil sludge, some water stream to a treated solids rewetting vessel.

10. The method of claim 1 wherein the routing of the second portion of the volume of surge OWS emulsion to the OWS separation unit comprises routing the second portion of the volume of surge OWS emulsion to one or more decanting centrifuges, producing a first low oil sludge, some water stream and a reduce solids surge OWS emulsion, and feeding the reduced solids surge OWS emulsion to one or more disc stack centrifuges, wherein if there are more than one disc stack centrifuge they are operated in parallel, series, or combination thereof, producing a clean oil stream, an oil/water sludge stream, and a water stream, combining the water stream with the first low oil sludge, some water stream to form a second low oil sludge, some water stream, and routing the second low oil sludge, some water stream to a treated solids rewetting vessel, and routing the oil/water sludge stream from the one or more disc stack centrifuges to combine with the feed composition.

11. The method of claim 1 wherein the routing of the second portion of the volume of surge OWS emulsion to the OWS separation unit comprises routing the second portion of the volume of surge OWS emulsion to one or more decanting centrifuges, producing an oil/water sludge stream and a reduce solids surge OWS emulsion, and feeding the reduced solids surge OWS emulsion to one or more disc stack centrifuges, wherein if there are more than one disc stack centrifuge they are operated in parallel, series, or combination thereof, producing a clean oil stream, a low oil content sludge stream, and a water stream, combining the water stream with the low oil content sludge stream to form a high water, low oil sludge stream, routing the high water, low oil sludge stream to a treated solids rewetting vessel, and routing the oil/water sludge stream from the one or more decanting centrifuges to combine with the feed composition.

12. The method of claim 1 performed continuously.

* * * * *